US009730173B2

(12) United States Patent
Hiltunen et al.

(10) Patent No.: US 9,730,173 B2
(45) Date of Patent: Aug. 8, 2017

(54) SYNCHRONIZATION BETWEEN DEVICES OF SAME OR DIFFERENT WIRELESS NETWORK

(71) Applicant: 9Solutions Oy, Oulu (FI)

(72) Inventors: Antti Hiltunen, Oulu (FI); Arto Pesonen, Kempele (FI)

(73) Assignee: 9Solutions Oy, Oulu (FI)

( * ) Notice: Subject to any disclaimer, the term of this patent is extended or adjusted under 35 U.S.C. 154(b) by 78 days.

(21) Appl. No.: 14/717,138

(22) Filed: May 20, 2015

(65) Prior Publication Data

US 2015/0341881 A1 Nov. 26, 2015

(30) Foreign Application Priority Data

May 22, 2014 (EP) .................................... 14169416

(51) Int. Cl.
*H04J 3/06* (2006.01)
*H04W 56/00* (2009.01)
*H04W 72/00* (2009.01)
*H04W 64/00* (2009.01)

(52) U.S. Cl.
CPC ....... *H04W 56/0015* (2013.01); *H04J 3/0638* (2013.01); *H04W 56/00* (2013.01); *H04W 56/005* (2013.01); *H04W 64/00* (2013.01); *H04W 72/005* (2013.01); *H04J 3/0664* (2013.01)

(58) Field of Classification Search
CPC ............. H04W 56/0015; H04W 56/00; H04W 64/00; H04W 72/005; H04W 56/005; H04J 3/0638; H04J 3/0664
USPC ........................................ 370/503, 350, 304
See application file for complete search history.

(56) References Cited

U.S. PATENT DOCUMENTS

| 7,151,944 | B2* | 12/2006 | Hashem | H04W 56/0045 |
| | | | | 375/E1.032 |
| 2003/0058833 | A1* | 3/2003 | Hashem | H04W 56/0045 |
| | | | | 370/350 |
| 2004/0087277 | A1* | 5/2004 | Edge | H04W 56/001 |
| | | | | 455/67.16 |
| 2007/0205896 | A1 | 9/2007 | Beber et al. | |

(Continued)

FOREIGN PATENT DOCUMENTS

| CN | 101075926 A | 11/2007 |
| CN | 101087219 A | 12/2007 |

(Continued)

OTHER PUBLICATIONS

Communication dated Oct. 29, 2014, issued by the European Patent Office in counterpart Application No. 14169416.
Su S-L et al: „Time Synchronization and Ranging for Multihop Mobile Radio Networks", Computers and Communications Integration Design, Analysis, Management. Miami, Florida, Apr. 8-10, 1986; [Proceedings of the Annual Joint Conference of the Computer and Communications Societies. (INFOCOM)], Silver Spring, IEEE Comp. Soc. Press, US, vol. Conf 5, Apr. 1, 1986 (Apr. 1, 1986), pp. 636-640, XP00809690.

*Primary Examiner* — Chuong T Ho
(74) *Attorney, Agent, or Firm* — Sughrue Mion, PLLC (57) ABSTRACT

This document discloses a solution for synchronizing two apparatuses of the same or different wireless network. A synchronization control apparatus may receive measurement reports from a first apparatus and a second apparatus, wherein at least one of the measurement reports comprises at least one information element indicating an offset between clocks of the first apparatus and the second apparatus. The synchronization control apparatus may synchronize the first apparatus and the second apparatus with each other on the basis of the measurement reports.

2 Claims, 5 Drawing Sheets

(56) References Cited

U.S. PATENT DOCUMENTS

| | | |
|---|---|---|
| 2008/0095131 A1 | 4/2008 | Aljadeff et al. |
| 2011/0051754 A1* | 3/2011 | Lansdowne ........... H04J 3/0673 370/503 |
| 2011/0268139 A1 | 11/2011 | Caracas et al. |
| 2012/0092184 A1* | 4/2012 | Carr .................. H04W 56/0015 340/870.14 |
| 2012/0136956 A1 | 5/2012 | Khoury et al. |
| 2013/0244653 A1* | 9/2013 | Song ................... H04W 56/001 455/436 |
| 2014/0111313 A1 | 4/2014 | Wild et al. |
| 2014/0228059 A1* | 8/2014 | Jalali .................... H04W 4/043 455/456.6 |
| 2015/0156740 A1* | 6/2015 | Hubball ................ H04J 3/0697 370/350 |

FOREIGN PATENT DOCUMENTS

| | | |
|---|---|---|
| CN | 101374155 A | 2/2009 |
| EP | 1427121 A1 | 6/2004 |
| EP | 2012446 A1 | 1/2009 |
| WO | 9957826 A1 | 11/1999 |
| WO | 2011153291 A2 | 12/2011 |

\* cited by examiner

SYNCHRONIZATION BETWEEN DEVICES OF SAME OR DIFFERENT WIRELESS NETWORK

TECHNICAL FIELD

The invention relates to synchronization between devices of the same wireless network and between two wireless networks.

TECHNICAL BACKGROUND

Typically, there is no need for two distinct wireless networks to maintain synchronization with respect to each other. A device switching from one network to another may simply synchronize to the new network in connection with the switch. However, in some applications, the synchronization between the wireless networks may be advantageous. In general, synchronization within devices of the same network may also be advantageous.

BRIEF DESCRIPTION

The invention is defined by the independent claims. Embodiments are defined in the dependent claims.

BRIEF DESCRIPTION OF THE DRAWINGS

In the following the invention will be described in greater detail by means of preferred embodiments with reference to the accompanying drawings, in which.

DESCRIPTION EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
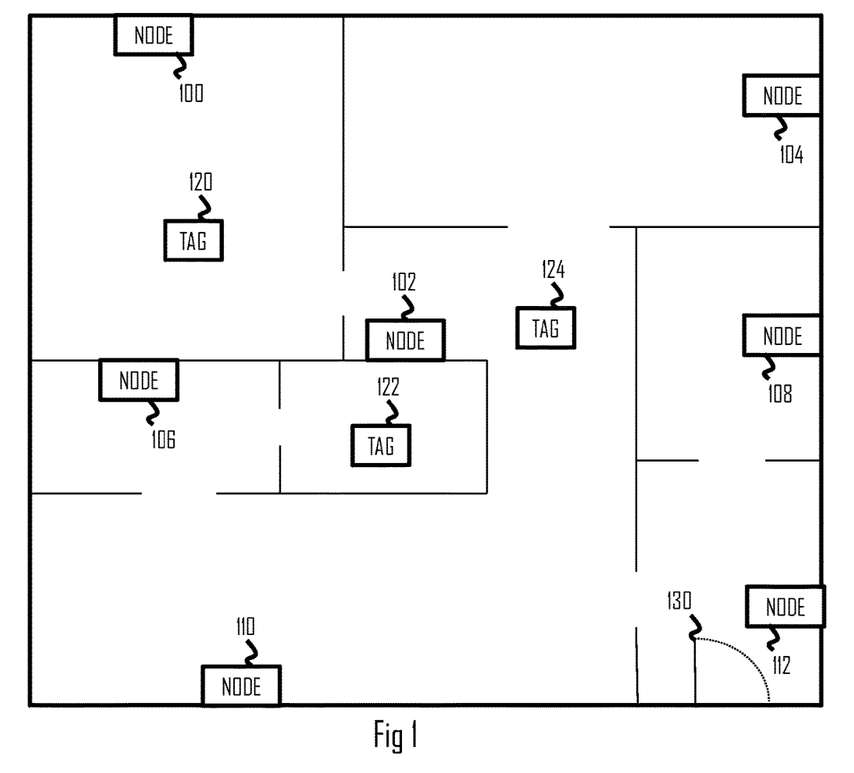
FIG. 1 illustrates an example of a system to which embodiments of the invention may be applied.

FIG. 1 illustrates an exemplary layout of an indoor area to which embodiments of an indoor location tracking system (LTS) may be applied. The layout of FIG. 1 illustrates a number of rooms with doors illustrated by discontinuations in the room walls, and a hallway providing access from one room to another. People or items inside the building that are being location-tracked are represented by their user equipment or, as from now on called, mobile devices 120, 122, 124. The mobile device 120 to 124 may be an apparatus dedicated to the location tracking, e.g. a tag. In general, the apparatus comprising the mobile device 120 to 124 may have other functionalities. For example, the mobile device may be a cellular phone, a palm computer, or any other portable electronic device. In some embodiments where the LTS uses Bluetooth communication capability, the apparatus may be any Bluetooth or Bluetooth Low Energy capable device. The same analogy applies to radio access schemes other than the Bluetooth.

Figure 2:
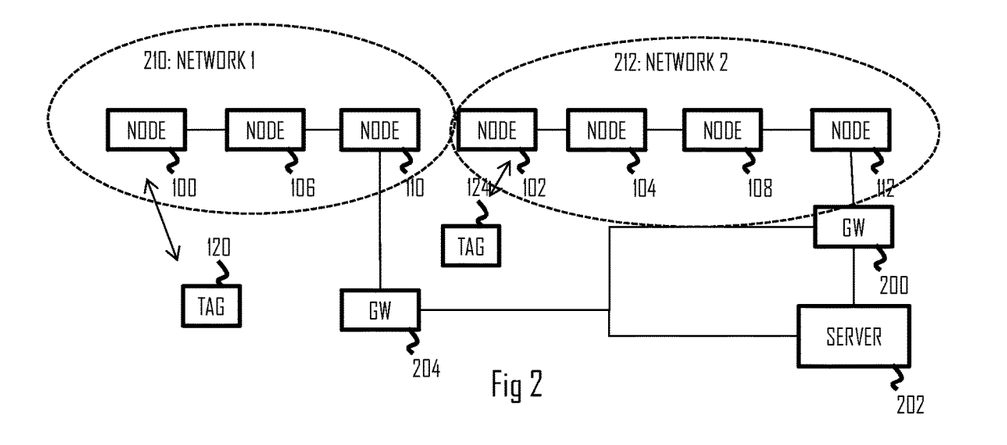
FIG. 2 illustrates routing in case the system comprises multiple wireless networks.

The location tracking is enabled by disposing a plurality of location tracking nodes (or LTS nodes) 100 to 112 throughout the area where the location tracking is to be carried out. The LTS nodes 100 to 112 may be radio communication devices, each configured to provide a radio coverage area effectively defined by transmission power and receiver sensitivity, for example, and the combined radio coverage areas of the LTS nodes 100 to 112 may be designed to cover the indoor location tracking area. The overall coverage of the LTS may be designed such that there exists no outage areas or "holes" in the coverage area, i.e. locations within the tracking area where the mobile device cannot be detected by any one of the LTS nodes or where the mobile device cannot detect any one of the LTS nodes. The LTS nodes 100 to 112 may also form one or more fixed or static communication network infrastructures enabling data routing amongst the nodes 100 to 112 and through the nodes 100 to 112. In some embodiments where the number of LTS nodes is high, a plurality of distinct networks may be established. FIG. 2 illustrates an embodiment of such a network infrastructure comprising multiple networks 210, 212. Referring to FIG. 2, the network topology of each network may be a pipeline topology where an arbitrary LTS node communicates with one or two neighbouring LTS nodes such that the LTS nodes of the same network form a pipelined structure. Other topologies are equally possible but the topology may be static or at least semi-static to enable reliable data transfer with low signalling and processing overhead. The LTS nodes 100 to 112 may be provided with a backup mechanism in preparation for one or more LTS nodes breaking and falling off from the network. An example of such a mechanism is providing an LTS node with an identifier of an auxiliary LTS node to which the LTS node connects to if it detects that one of its neighbouring LTS nodes has dropped from the network.

The networks 210, 212 may be distinguished from each other such that the nodes 100, 106, 110 of a first network 210 establish wireless communication links or connections with only other nodes of the first network 210. Similarly, the nodes 102, 104, 108, 112 of a second network 212 establish wireless communication links or connections with only other nodes of the second network 212. In other words, no link layer or physical layer connections are established between nodes of different networks. In some embodiments, the nodes of the first network 210 are configured to detect broadcast messages transmitted by nodes of the second network 212 and vice versa. In some embodiments, nodes of the first network 210 are even configured to exchange messages with the nodes of the second network 212 but through the infrastructure of their own network, e.g. through one or more nodes to gateways 200, 204 bridging the two networks 210, 212.

A location tracking apparatus or a module that may be comprised in a server 202 may be connected to the networks of LTS nodes 100 to 112 directly or through one or more gateway nodes 200, 204, and the location tracking apparatus may be configured to maintain locations of tracked objects and control the location tracking and other features of the LTS. The server 202 and the location tracking apparatus may be realized by a computer provided with suitable communication equipment so as to enable a communication connection with the LTS nodes 100 to 112. The server 202 may be connected to the gateway nodes 200, 204 via an Internet Protocol (IP) connection, and the gateway nodes 200, 204 serving as network routers may be configured to connect to the fixed networks of LTS nodes 100 to 112 through another connection type. The connection between the gateway node 200, 204 and the corresponding network 212, 210 may be established by using radio connections according to a Bluetooth technology, but it should be understood that other radio communication schemes may be used as well, e.g. IEEE 802.11, radio frequency identification (RFID), or Zigbee. As discussed above, each network 210, 212 may be connected to at least one gateway node 200, 204 and the gateway nodes 200, 204 may be connected to each other over wired and/or wireless connections. As a consequence, the interconnection between the gateway nodes 200, 204 may be used to route messages between the networks 210, 212.

The locations of objects are tracked by tracking movement of tags 120 to 124 attached to the objects. As examples of the tags 120 to 124, a user tag may be carried by a person, and an asset tag may be attached to an asset. The asset may be any mobile or portable apparatus that is wanted to be tracked, e.g. a wheelchair, a computer, or expensive industrial testing equipment. The asset tag may equally be attached to a fixed apparatus, e.g. a safe, a projector, in order to detect attempted robbery. The different tags 120 to 124 whose movement and location are tracked may be called generally mobile devices, although some of the tags 120 to 128 may actually be in a substantially fixed position. The location tracking may be based on a scheme where a mobile device is configured to detect the closest LTS node and to transmit to the server 202 periodically a message comprising an identifier of the mobile device and an identifier of the detected closest LTS node, or a plurality of detected LTS nodes. The message may be routed through the fixed network of LTS nodes to the server 202. As the server 202 is provided with information on fixed locations of the LTS nodes 100 to 112, e.g. in a layout of the area, the server 202 is able to associate the mobile device with the LTS node on the basis of the received message and, thus, determine the location of the mobile device and the object associated with the mobile device. In another embodiment, an LTS node is configured to detect mobile devices in its coverage area and transmit identifiers of detected mobile devices to the server 202. Similarly, the server 202 may then determine the location of each mobile device on the basis of the LTS nodes that have detected the mobile device. The detection of the LTS nodes or mobile devices may be based on Bluetooth Low Energy (BTLE) advertising procedure. The LTS may, however, utilize another location tracking scheme and/or another communication scheme.

The apparatus carrying out the detection and reporting to the server, e.g. an LTS node detecting mobile devices or a mobile device detecting LTS nodes, may be configured in a detection procedure to report a closest detected apparatus (as determined by the highest estimated reception power), a determined number of closest detected apparatuses, or all the detected apparatuses. The detection may include at least one threshold in the apparatus reporting the detection, e.g. a LTS node or a mobile device. The threshold may be a rapid detection threshold, and a mobile device may be configured to estimate a received signal strength indicator (RSSI) or another metric proportional to a reception power for a signal received from an LTS node. If the RSSI exceeds the rapid detection threshold, the mobile device may instantly link to the LTS node without waiting for further signals from other LTS nodes. This speeds up the positioning and reduces operations carried out in the mobile device, thereby also reducing power consumption. If the RSSI is below the rapid detection threshold, the mobile device may be configured to continue the detection procedure by attempting to detect other LTS nodes and then collectively transmit to the server a message comprising identifiers of the detected LTS nodes. The operation is similar when the LTS attempts to detect the mobile devices and applies the rapid detection threshold. Another example of the threshold is a discarding threshold, wherein those apparatuses that are detected but whose RSSI is below the discarding threshold are discarded from the report. This eliminates reporting and possible positioning to LTS nodes that are far from the mobile device.

Referring to FIG. 2 illustrating routing of signals between the elements of the system according to an embodiment of the present invention. As already mentioned, the LTS node(s) 100 to 112 may transmit their unique identifiers (IDs) by utilizing the BTLE advertising messages or other connectionless means for radio transmitting/broadcasting a unique identifier without establishing an actual radio connection. The LTS nodes 100 to 112 may also form the fixed networks used for routing messages in the LTS between the server and the mobile devices 120 to 124 and/or the LTS nodes 100 to 112 or, in general, between any two or more elements of the LTS. The mobile device(s) 120 to 124 detecting the radio transmissions/broadcasts of the LTS nodes 100 to 112 may connect to any one of the LTS nodes and to forward the detected unique identifiers to the server over the fixed network of LTS nodes configured to route signals through the network to the server 202. In another embodiment, the mobile devices may rely on connectionless broadcast transmissions for reporting the detected identifiers to the nearby LTS nodes that forward the report to the server. The mobile device may include its identifier, e.g. a transaction identifier or a device identifier, in the broadcast message. One or more of the LTS nodes may be connected to the gateway 200, 204 connected also to a wired network, e.g. Ethernet, so as to connect to the server. The connection to the wired network may be realized by providing a router apparatus or a gateway node 200 providing a wireless connection with the fixed network through at least one LTS node 112 and the wired connection to the server 202. If the server 202 is located in a remote location, the connection between the fixed network and the server 202 may be routed through the Internet. The networks 210, 212 may be based on any Bluetooth network technology. Other embodiments may utilize other communication technologies to implement the network, such as IEEE 802.11x (WiFi).

It should be appreciated that at least some of the embodiments of the invention described below are applicable to indoor positioning systems. However, principles of the present invention may be applied to other systems comprising multiple wireless networks. Below, some embodiments for carrying out synchronization between the networks 210, 212 are described. In the context of the indoor location tracking systems comprising multiple networks, it may be advantageous that the nodes of the different networks transmit beacon signals in a synchronous manner. In the embodiments where the system is the indoor positioning system, the beacon signals may be used for the location tracking in the above-described manner. Such synchronous transmission enables the use of transmission periods and non-transmission periods on the system level. This enables a mobile device moving from a coverage area of the first network 210 to a coverage area of the second network 212 in the system to utilize the same power-saving parameters in both networks, e.g. the same timing for entering a sleep mode during a non-transmission period and waking up to scan for the beacon during a transmission period. Similarly in the embodiments where the mobile devices broadcast the beacon signals, the LTS nodes of the different networks may all employ the same timing for the dozing. At least some of the LTS nodes may be powered by a battery and, accordingly, dozing and other power-save features may be employed.

As described above, the server 202 may comprise the location tracking apparatus configured to monitor for the locations of the mobile devices 120 to 124. The server may additionally comprise a control apparatus or a control module configured to control operational parameters of the LTS and/or the mobile devices. The control apparatus may monitor synchronization amongst nodes of each network 210, 212 and, additionally, synchronization between the networks 210, 212 and provide control commands instructing nodes to carry out clock adjustments to maintain the synchronization.

Figure 3:
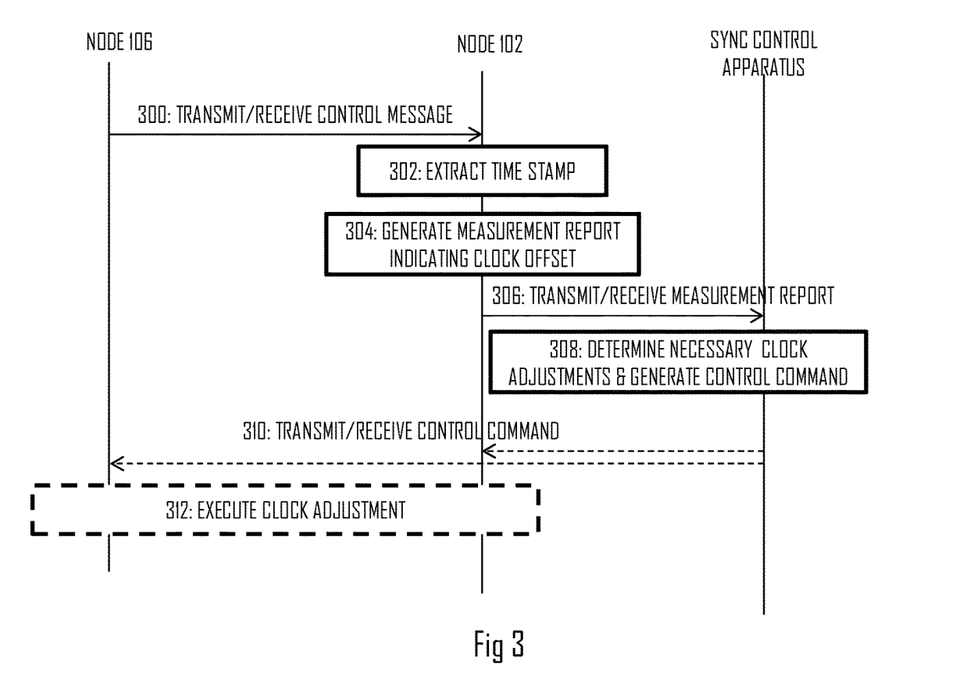
FIG. 3 illustrates a signalling diagram of maintaining synchronization between wireless networks according to an embodiment of the invention.

FIG. 3 illustrates a signalling diagram of an embodiment for synchronizing nodes of different wireless networks. Let us use as an example a node 106 of the first network 210 and a node 102 of the second network 212. Embodiments described below are based on exchanging control messages between nodes of the different networks and adjusting clocks of the nodes on the basis of this exchange. Referring to FIG. 3, the node 106 may determine a value indicating a current time in its internal clock and generate a control message comprising a time stamp indicating the value. In step 300, the node 106 transmits the control message. In an embodiment, the transmission is a broadcast transmission. The control message may thus be addressed to a broadcast address. The control message may be transmitted by using the Bluetooth or another radio transmission technology.

The node 102 receives the control message over a radio interface in step 300 and extracts its contents in block 302. Block 302 may comprise extracting the time stamp from the control message. In an embodiment, the node 102 may determine a time of reception for the control message. The time of reception may be determined by reading a time value from an internal clock of the node 102 at a certain point in reception processing of the control message. The time value read from the internal clock may be advanced according to a certain criterion to make the time value comparable with the time value indicated by the stamp comprised in the control message. For example, radio propagation may cause difference in the time values. In an embodiment, the node 102 may estimate a radio propagation delay between the nodes 106, 102 and subtract the estimated delay from the time value read from the internal clock of the node 102. In a similar manner, the node 102 may estimate processing delays associated with transmission and/or reception of the control message and subtract such delay(s) from the time value read from the internal clock of the node 102. State-of-the-art propagation and/or processing delay algorithms may be employed to estimate the delay(s).

In block 304, the node 102 generates a measurement report comprising at least one information element indicating an offset between the time stamp and an internal clock of the apparatus. Embodiments of the at least information element are described below with reference to FIGS. 4A and 4B. The better the above-described time values of the nodes 102, 106 are comparable, the better the offset represents true clock offset between the nodes. In step 306, the node 102 transmits the measurement report to a synchronization control apparatus which may be comprised in the server 202. The measurement report may be routed through the network of the node 102, i.e. through the nodes 104, 108, 112 of the second network 212 and through the gateway 200. The synchronization control apparatus receives the measurement report in step 306 and extracts the at least one information element indicating the clock offset from the measurement report.

In block 308, the synchronization control apparatus determines the degree of the clock offset and determines to execute a clock adjustment of at least one of the nodes 102, 106. Depending on the master reference clock currently employed and the current time of the master reference clock, the synchronization control apparatus may choose to adjust the clock of one of the nodes 102, 106 or clocks of both nodes 102, 106. In block 308, the synchronization control apparatus generates a control command for each node 102, 106 it has decided to reconfigure. The synchronization control apparatus may insert a clock adjustment value to the control command, the clock adjustment value indicating how much the clock of the corresponding node is instructed to be adjusted. In step 310, the synchronization control apparatus transmits the control commands to the respective one or more nodes 102, 106 through the network(s) of the corresponding node(s). Upon receiving the control command, the node 102 and/or 106 executes clock adjustment according to the clock adjustment value comprised in the received control command and adjusts the time of the internal clock of the node. In an embodiment, the node receiving the control command may respond with an acknowledgment such that the synchronization control apparatus may ascertain the reception of the control command.

In an embodiment, the synchronization control apparatus assigns an adjustment identifier to each control command instructing the clock adjustment. Each adjustment identifier may thus be linked to a different clock adjustment applied to the nodes wireless networks, and the adjustment identifier may thus be used to determine the time reference of the node. The node may insert the adjustment identifier to the measurement report so that the synchronization control apparatus may determine from the received adjustment identifier the time reference most recently applied to the reporting node. The synchronization control apparatus may store a database comprising executed clock adjustment commands and associated adjustment identifiers. Upon receiving from a reporting node a measurement report comprising an adjustment identifier, the synchronization control apparatus may refer to the database and determine the latest clock adjustment command sent to the node. If the latest clock adjustment command is associated with the same identifier as comprised in the received measurement report, the synchronization control apparatus may determine that the node has executed the command and it may consider further clock adjustments. If the latest clock adjustment command is associated with an identifier different from that comprised in the received measurement report, the synchronization control apparatus may determine that the node has not executed the latest command and it may discard the information on the received measurement report or reiterate the latest clock adjustment command. In this manner, the effect of clock adjustment commands executed by the synchronization control apparatus but not realized in the node may be avoided.

In an embodiment, the synchronization control apparatus determines the necessary clock adjustments in block 308 such that the internal clocks of the nodes 102, 106 become substantially synchronized. The required synchronization accuracy may depend on the embodiment but, typically, sufficient synchronization accuracy is in the order of milliseconds, e.g. ten milliseconds or less. The required synchronization accuracy may also affect the frequency of transmitting the measurement reports. When high accuracy is needed, more frequent transmission of the measurement reports may be required. When less accuracy is needed, less frequent transmission of the measurement reports is needed, thus reducing the traffic overhead in the networks. A reporting period may be one minute or longer, e.g. a few minutes. Accordingly, a node may transmit a measurement report once during the reporting period.

Figure 4A:
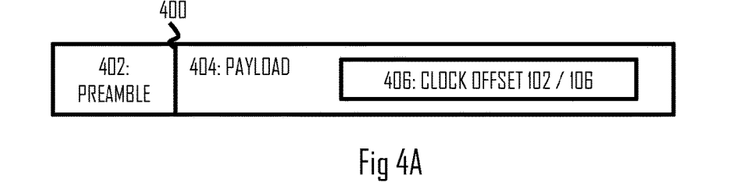
FIGS. 4A and 4B illustrate embodiments of a measurement report.

FIGS. 4A and 4B illustrate embodiments of the measurement report indicating the offset between the clocks of the nodes 102, 106. Referring to FIG. 4A, the measurement report 400 may comprise a preamble 402 and a payload portion 404. The preamble 402 may carry any control information necessary to deliver the measurement report from the reporting node, e.g. node 102, to the synchronization control apparatus. The payload portion 404 may comprise the information element(s) indicating the offset between the nodes 102, 106. In the embodiment of FIG. 4A, the payload portion 404 comprises an information element 406 comprising a clock offset value representing the clock offset between the nodes 102, 106. Additionally, the payload portion 404 may comprise an identifier of the node from which the control message used as a basis for computing the clock offset value 406 was received (in step 300), e.g. the identifier of the node 106. An identifier of the reporting node 102 may be comprised in the preamble 402 to enable the synchronization control apparatus to link the two nodes associated with the clock offset value 406. The reporting node 102 may compute the clock offset value by computing a difference between the time value indicated by the time stamp comprised in the receiver control message and the time value representing the reception timing of the control message.

Figure 4B:
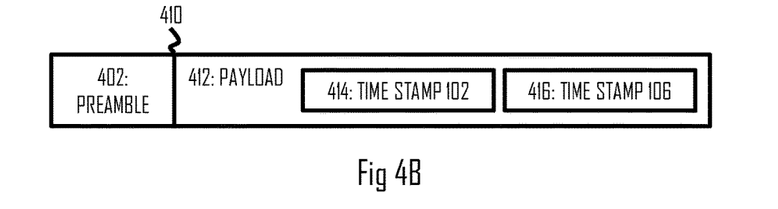

Referring to measurement report 410 of FIG. 4B, the measurement report 410 may comprise the preamble 402 and the payload portion 412. In this embodiment, the payload portion 412 may comprise two time stamps: the time stamp 416 comprised in the received control message to indicate the clock of the node 106 and a time stamp 414 indicating the reception timing of the control message, i.e. the clock of the node 102. Then, the synchronization control apparatus may compute the offset from the two time stamps. In this embodiment, the payload portion 404 may also comprise the identifier of the node from which the control message was received (in step 300), e.g. the identifier of the node 106.

Since the measurement report indicates the offset between the clocks of the nodes 102, 106, the absolute time values of the internal clocks or the delay in transferring the measurement report to the synchronization control apparatus has little relevance in terms of determining the clock adjustments. This enables the use of the centralized control in maintaining the synchronization between the networks by the synchronization control apparatus. Centralized control may provide better overall synchronization in the system compared with a scenario where the nodes autonomously determine to adjust their clocks. The synchronization control apparatus is able to determine the offset between the clocks of the nodes 102, 106 from the measurement report and offsets between other node pairs from other measurement reports. As a result, the synchronization control apparatus may construct an overall picture of mutual offsets between clocks of any two nodes of the networks of the system by concatenating the offsets comprised in the measurement reports. The synchronization control apparatus is also able to estimate clock drifts of the nodes and carry out clock adjustment commands to minimize the drifting.

Figure 5:
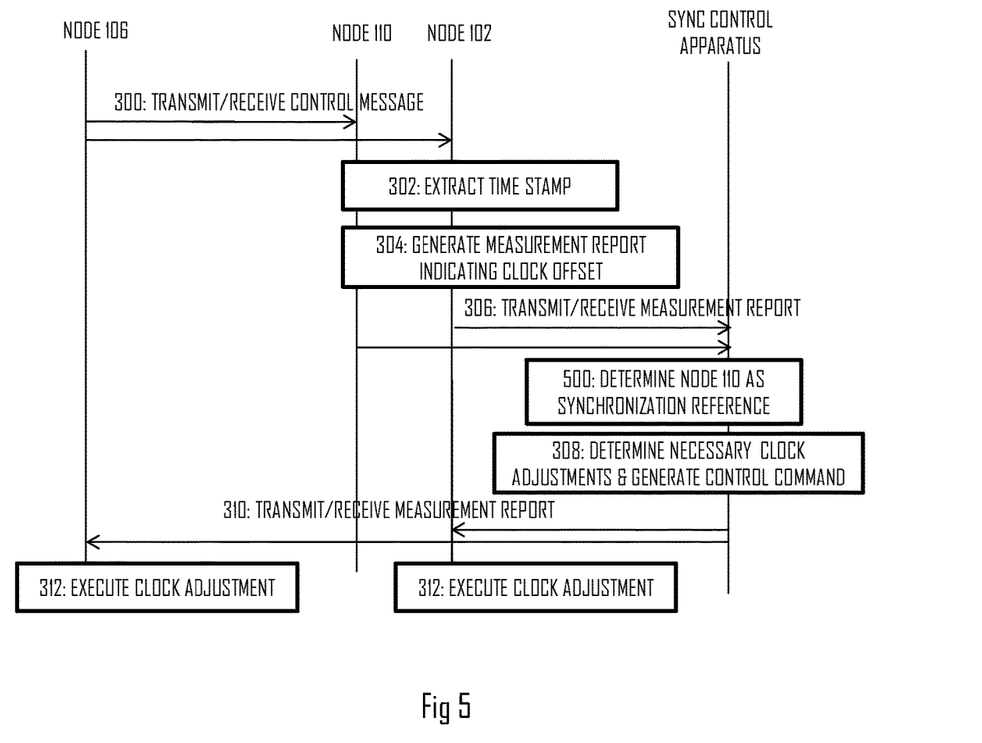
FIG. 5 illustrates a signalling diagram of maintaining synchronization between wireless networks according to another embodiment of the invention.

FIG. 5 illustrates an embodiment where the synchronization control apparatus concatenates the offsets comprised in the received measurement reports in order to determine the clock adjustments. In FIG. 5, the same reference numbers as in FIG. 3 represent the same or substantially similar operations. Referring to FIG. 5, nodes 102, 110 receive the control message transmitted by the node 106 and generate corresponding measurement reports in block 302. The measurement report generated by the node 110 comprises at least one information element indicating a clock offset between the nodes 106, 110, and the measurement report generated by the node 102 comprises at least one information element indicating a clock offset between the nodes 106, 102. The measurement reports are then transmitted to the synchronization control apparatus in step 306. Upon receiving the measurement reports, the synchronization control apparatus may compute the clock offsets between any pair of the nodes 102, 106, 110 on the basis of the contents of the received measurement reports by combining the clock offsets of the measurement reports For example, the measurement report received from the node 110 may indicate that the clock of the node 110 is ahead of the clock of the node 106 by X, while the measurement report received from the node 102 may indicate that the clock of the node 102 is behind of the clock of the node 106 by Y. Then, the synchronization control apparatus may determine that the offset between the clocks of the nodes 102, 110 is X+Y=Z. A general equation for computing the offset between two arbitrary nodes may be defined as:

$$O_{TOT} = O_1 + O_2 + \ldots + O_N \tag{1}$$

where $O_{TOT}$ is the offset between the arbitrary nodes and $O_1$ to $O_N$ represent offsets between nodes in a path from one of the arbitrary nodes to the other, wherein the path is formed through links provided by the measurement reports. These paths do not typically follow the links or routes through which messages are routed in the wireless networks 210, 212. In terms of the values of the offsets $O_1$ to $O_N$, a positive value may indicate that the clock of the reporting node is ahead of the clock of the other node indicated in the measurement report while a negative value may indicate that the clock of the reporting node is behind the clock of the other node indicated in the measurement report.

Referring back to FIG. 5, the synchronization control apparatus may determine a synchronization reference, e.g. a master clock, in block 500. Let us assume that the node 110 is selected as the synchronization reference. Since the synchronization control apparatus is aware of the clock offsets between the nodes 106, 110 and nodes 106, 102, it may compute the clock offset between the nodes 110 and 102 by using Equation (1) even if it has not received a measurement report directly indicating this clock offset. Accordingly, the synchronization control apparatus may determine the necessary clock adjustments for the nodes 102, 106 on the basis of the measurement reports received in step 306 and configure the nodes 102, 106 to synchronize their clocks such that the clocks are synchronized with the clock of the node 110. The control commands instructing the clock adjustments are transferred from the synchronization control apparatus to the nodes 102, 106 in step 310 and the nodes 102, 106 carry out the clock adjustments in blocks 312.

It should be appreciated that while the embodiments described above are described in the context where the nodes 100 to 112 exchange the control messages, transmit the measurement reports, and maintain mutual synchronization, the concept may be equally applied to scenarios where the tags 120 to 124 carry out the same operations. In some embodiments, the nodes 100 to 112 and the tags 120 to 124 may maintain the synchronization in the above-described manner. The tags 120 to 124 may exchange the control messages amongst the tags and/or the tags 120 to 124 and the nodes 100 to 112 may exchange the control messages between them regardless of their role in the system, i.e. the tags may exchange the control messages with the nodes and vice versa. Any device of the system may thus transmit and receive the control messages from any other device of the system, generate and transmit the measurement report, and receive the clock adjustments from the synchronization control apparatus.

It should be appreciated that while the embodiments described above are described in the context where the control messages are broadcasted to the radio interface, the control messages may be transmitted as unicast or multicast messages routed through the wireless networks. In an embodiment, a first node of the first network 210 may address a control message to a second node of the second network and transmit the control message to the second node through the one or more nodes of the first network and through one or more nodes of the second network. In the context of the system of FIG. 2, the control message may be routed through the gateway nodes 200, 204. Similarly, a multicast control message may be addresses to a plurality of recipients and the multicast control message may be routed to the recipients through the wireless networks. Such routing may cause additional transmission delays with respect to the broadcasting, but there exist state-of-the-art delay estimation algorithms to estimate these types of propagation delays. In case the required synchronization accuracy is not very high, inaccuracy in the clock offset indicated to the synchronization control apparatus may be acceptable.

It should be appreciated that while the embodiments are described above in the context where synchronization between two distinct wireless networks is achieved on the basis of the exchange of control messages between apparatuses of the different wireless networks, the embodiments are equally applicable to carrying out synchronization within one wireless network. The embodiments of FIGS. 3 and 5, for example, are equally applicable to the situation where the nodes are all comprised in the same network.

In an embodiment, a clock of the synchronization control apparatus needs not to be synchronized with the master reference clock.

The synchronization control apparatus may maintain a database of current clock values of each node of the system. Upon making the clock adjustment on the basis of a measurement report received from a node, the synchronization control apparatus may update the adjusted clock value as the current clock value for the node in the database. Referring to the system of FIG. 1, the database may have the following form:

TABLE 1

| Node | Clock |
| --- | --- |
| 100 | T1 |
| 102 | T2 |
| 104 | T3 |
| 106 | T4 |
| 108 | T5 |
| 110 | T6 |
| 112 | T7 |

In another embodiment, the synchronization control apparatus may maintain a database storing the clock offsets between each node pair or a subset of node pairs that may be derived from the nodes of the system. The clock offsets may be included in the database in such manner that a selective concatenation of the offsets provides the path between any two nodes of the system. Referring to the system of FIG. 1, the database may have the following form:

TABLE 2

| Node Pair | Clock Offset |
| --- | --- |
| 100-106 | O1 |
| 100-102 | O2 |
| 102-104 | O3 |
| 106-110 | O4 |
| 102-108 | O5 |
| 108-104 | O6 |
| 108-112 | O7 |

The database of the Tables 1 and 2 may be constructed on the basis of the measurement reports, i.e. on the basis of the nodes that can detect each other, regardless of whether or not they belong to the same wireless network. In both cases of Tables 1 and 2, the database may be used to provide the paths between any two arbitrary nodes of the system and enable the clock adjustment throughout the system at any given point of time. The databases may be updated after transmitting the clock adjustment commands.

Since the synchronization control apparatus carries out the clock adjustments, it may also store statistics about the performed clock adjustments. Accordingly, it may monitor if a certain node needs frequent clock adjustments. This may indicate that the clock of the node is malfunctioning and exhibits clock drifting with respect to other clocks of the system. In case a multiple nodes need frequent clock adjustments, it may be determined that the master reference clock may be drifting and, as a consequence, the synchronization control apparatus may choose to change the master reference clock. The new master reference clock may be selected amongst nodes configured to use a reference clock of a satellite navigation system such as the Global Positioning System (GPS).

In an embodiment, the synchronization control apparatus may monitor clock drifting in each node on the basis of the received measurement reports. If the synchronization control apparatus detects that a clock of a node is drifting by a certain constant degree, the synchronization control apparatus may create a control command comprising an information element instructing the node to compensate the drifting with a determined drift compensation value. For example, if the synchronization control apparatus detects from a plurality of measurement reports that the clock of the node needs constant clock adjustments and causes a constant clock drift the synchronization control apparatus may estimate the clock drift and insert a correction value derived from the estimated clock drift to the control command. If the clock is detected to constantly advance and the drift is one millisecond per hour, the correction value may instruct the node to add a millisecond per each hour to the clock value derived from the clock. In this manner, generation of repeated clock adjustment commands may be reduced.

Figure 6:
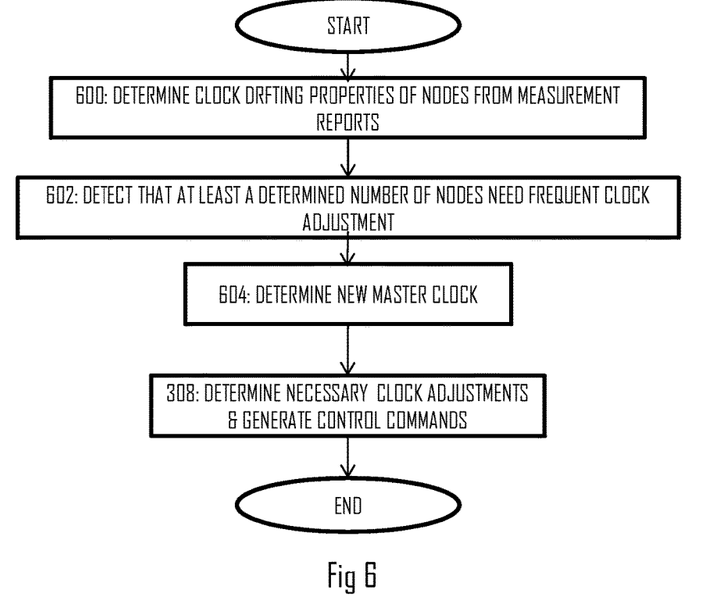
FIG. 6 illustrates a flow diagram of monitoring properties of the network and changing a master reference clock according to an embodiment of the invention.

FIG. 6 illustrates a flow diagram of an embodiment for determining the need for changing the master reference clock in the synchronization control apparatus. Referring to FIG. 6, the synchronization control apparatus may monitor clock drifting properties of nodes from the measurement reports and the instructed clock adjustments. Block 600 may comprise monitoring a frequency of executed clock adjustments in each node. Block 600 may comprise monitoring a tendency of clock adjustments in each node, e.g. whether or not the clock of the node has been constantly advanced or delayed. Block 600 may comprise monitoring a number and/or direction of clock adjustments executed for each node within a determined time window.

In block 602, the synchronization control apparatus detects on the basis of the monitoring that at least a determined number of nodes needs frequent clock adjustments. In an embodiment, the synchronization control apparatus detects that the number of clock adjustments executed for a node within the time window is higher than a determined threshold. This may cause output of a notification signal indicating that the clock is malfunctioning and the node needs maintenance.

In an embodiment, the synchronization control apparatus detects in block 602 that the number of nodes that have needed at least a determined number of clock adjustments within the time window is higher than a determined threshold. As a result, the synchronization control apparatus may make a decision that the current master reference clock is drifting. Then, the synchronization control apparatus may select a new master reference clock in block 604. Upon selecting the new master reference clock, the synchronization control apparatus may start to execute clock adjustments that cause the nodes of the system to adjust their clock such that the synchronization is achieved with respect to the new master reference clock (block 308). This may be carried out in response to the measurement reports received after the execution of block 604. In another example, the synchronization control apparatus may employ a certain tolerance when deciding the clock adjustments on the basis of the measurement reports. If the clock offset with respect to the current master reference clock is within the tolerance, the synchronization control apparatus may decide not to execute the clock adjustment. When changing the master reference clock, some nodes whose clock was within the tolerance may not be within the tolerance after the change. As a consequence, the synchronization control apparatus may employ Table 1 or Table 2 to detect those nodes that need immediate clock adjustment after the execution of block 604. Then, the synchronization control apparatus may execute the clock adjustments without waiting for the measurement reports from these nodes.

Figure 7:
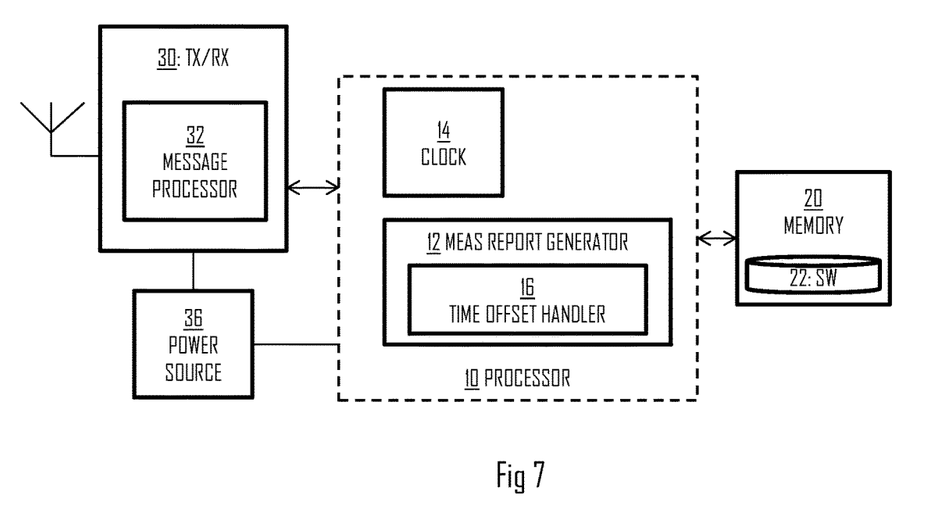
FIGS. 7 and 8 illustrate block diagrams of apparatuses according to some embodiments of the invention.

FIG. 7 illustrates a block diagram of an embodiment of an apparatus according to an embodiment of the invention. In an embodiment, the apparatus is the node 100 to 112 or the tag 120 to 124. The apparatus may comprise at least one processor 10 and at least one memory 20 storing a computer program code 22. The at least one processor 10, at least one memory 20, and computer program code 22 may cause the apparatus to execute the functions of the node or the tag in the above-described manner. The apparatus may further comprise a power source 36 providing the apparatus with power supply. The power source may be connected to the mains and/or comprise a battery. The apparatus may further comprise a communication circuitry 30 configured to provide the apparatus with radio connectivity. The communication circuitry 30 may comprise a radio frequency (RF) circuitry executing radio frequency operations and frequency conversion from the radio frequency to a baseband. The communication circuitry 30 may further comprise a baseband circuitry configured to perform baseband signal processing operations. The baseband circuitry may comprise a message processor 32 configured to extract contents from received messages such as the control messages and the control commands and to generate messages that are to be transmitted from the apparatus, e.g. the measurement reports. The communication circuitry 30 may be connected to the processor 10 via an interface.

The processor may comprise a clock 14 providing the apparatus with a local time reference. The clock may be connected to the message processor 32 such that the message processor is configured to transmit the control messages with a determined periodicity derived from the clock 14 and timing rules applied by the message processor 32 for the transmission of the control messages. The message processor may further refer to the clock 14 when receiving a control message and associate a reception timing with the control message when outputting the contents of the control message to the processor 10.

The processor 10 may further comprise a measurement report generator 12 configured to generate the measurement reports on the basis of the control messages received from the message processor 32. The measurement report generator may comprise a time offset handler configured to determine the contents of the measurement report with respect to the manner of indicating the offset between the reception timing received from the message processor 32 and the time stamp comprised in the received control message. Above, some embodiments for indicating the offset has been described, and the time offset handler may use any one of those embodiments. Then, the measurement report generator 12 may output the contents of the measurement report, e.g. the identifier of the transmitter of the received control message and the information indicating the timing offset between the reception timing and the time stamp comprised in the received control message to the message processor 32, and the message processor may generate the measurement report and transmit the measurement report as addressed to the synchronization control apparatus.

Figure 8:
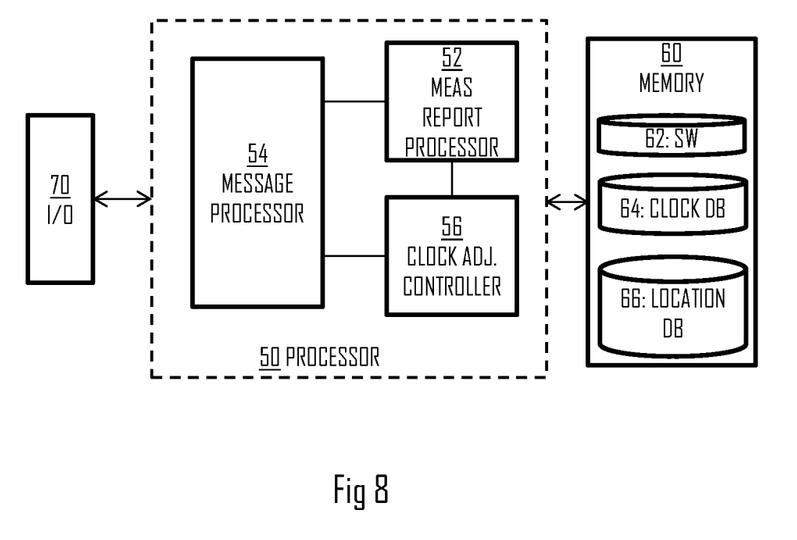

FIG. 8 illustrates a block diagram of an embodiment of an apparatus according to another embodiment of the invention. In an embodiment, the apparatus is the synchronization control apparatus. As described above, the synchronization control apparatus may be the server 202 or be comprised as an operational component of the server 202. The server 202 may have other functions as well, e.g. the location tracking of the tags 120 to 124. The apparatus may comprise at least one processor 50 and at least one memory 60 storing a computer program code 62. The at least one processor 50, at least one memory 60, and computer program code 62 may cause the apparatus to execute the functions of the synchronization control apparatus in the above-described manner.

The apparatus may comprise input/output (I/O) circuitry 70 configured to provide a network connection to the devices 100 to 124 of the system. The I/O circuitry 70 may comprise components or structures necessary to establish the network connection according to determined communication protocols, e.g. Internet protocol (IP) and Ethernet protocol. The processor 50 may comprise a message processor 54 configured to process received measurement reports by extracting the contents of the measurement reports and outputting the contents to a measurement report processor 52. The measurement report processor 52 may extract the timing offsets from the received measurement report and, additionally, the measurement report processor may refer to a clock database 64 stored in the memory 60 to check the timing offsets of the nodes with respect to the current master reference clock in the above-described manner. Then, the measurement report processor 52 may output the offset information to a clock adjustment controller 56. The clock adjustment controller 56 may be configured to determine the clock adjustments needed. The clock adjustment controller 56 may also manage the selection of the master reference clock in the above-described manner. Upon determining the necessary clock adjustments, the clock adjustment controller 56 may output the clock adjustment to the message processor 54, and the message processor may generate the control command and transmit the control command as addressed to the device associated with the clock adjustment.

In some embodiments, the processor 50 or a processing circuitry 50 may have other functions, e.g. the location tracking of the mobile devices. Then, the processing circuitry 50 may comprise a location tracking module configured to receive the location tracking messages, determine current locations of the mobile devices from the received messages, and store the locations of the mobile devices in a location database 66 in the memory 60.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 3, 5 and 6 may also be carried out in the form of one or more computer processes defined by one or more computer programs. A computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless network employing the wireless communication technologies defined above but also to other suitable wireless networks. The protocols and the specifications of network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor and at least one memory storing a computer program code, wherein the at least one processor, least one memory, and the computer program code cause the apparatus to;
   receive measurement reports from a first apparatus and a second apparatus, wherein at least one of the measurement reports comprises at least one information element indicating an offset between clocks of the first apparatus and the second apparatus;
   generate a control command for at least one of the first apparatus and the second apparatus to execute a clock adjustment on the basis of the offset such that clocks of the first apparatus and the second apparatus become synchronized; and
   transmit the control command to the at least one of the first apparatus and the second apparatus,
   wherein the measurement reports are received from a plurality of apparatuses of a first wireless network and a plurality of apparatuses of a second wireless network different from the first wireless network, each measurement report indicating an offset between two apparatuses, and wherein the at least one processor, at least one memory, and the computer program code cause the apparatus to:
   receive a first measurement report from the first apparatus indicating a first offset between the clocks of the first apparatus and the second apparatus and a second measurement report from a third apparatus indicating a second offset between clocks of the second apparatus and a third apparatus; and
   generate the control command for the first apparatus to execute a clock adjustment on the basis of the first offset and the second offset.

2. The apparatus of claim 1, wherein the at least one processor, at least one memory, and the computer program code cause the apparatus to:
   maintain, on the basis of the received measurement reports, a database storing information on clock drifting for each apparatus of the first wireless network and the second wireless network;
   select a new master reference clock on the basis of the database; and
   transmit, upon selecting the new master reference clock, control commands to the apparatuses of the first wireless network and the second wireless network to execute clock adjustments to synchronize to the new master reference clock.

* * * * *